United States Patent Office 2,781,385
Patented Feb. 12, 1957

2,781,385

DIAMIDOCARBOXYLIC ACIDS AND CERTAIN SALTS THEREOF

John D. Spivack and William J. Lennon, Cranston, and Harry Kroll, Warwick, R. I., assignors to Geigy Chemical Corporation, a corporation of Delaware No Drawing. Application September 21, 1953, Serial No. 381,486

6 Claims. (Cl. 260—404.5)

This invention relates to new diamidocarboxylic acids and their alkali metal and alkaline earth metal salts and method for the preparation thereof. We believe that the diamidocarboxylic acids and their alkali metal and alkaline earth metal salts of this invention are new chemical compositions of matter.

Certain amides of long chain higher fatty acids are known. In U. S. Patent #2,462,358 there is disclosed the synthesis of an acetoacetyl amide having an acyl residue attached to one nitrogen atom which is of a higher fatty acid or naphthenic acid, such as the composition $C_{17}H_{37}CONHC_2H_4NHCOCH_2COCH_3$. U. S. Patents #2,490,744 and #2,540,800 present the alkenyl succinic anhydride amine reaction product, alleged to confer rust-proofing properties to lubricating oils. In German Patent #546,942 the subject matter is the synthesis of substituted amides of higher fatty acids by the reaction of saturated or unsaturated higher fatty acids with aliphatic carboxylic acids or their salts having a primary or secondary amino group. Mentioned under the second reactant, other than the illustrated aspartic acid, is N-methyl aspartic acid and iminodiacetic acid. But with any of these three reactants there would be a monoamidocarboxylic acid, and in the impure salt form.

Our invention is concerned with the synthesis of diamidocarboxylic acids and their salts alkali metal and alkaline earth metal, in which an aliphatic acid residue is bound to an amide nitrogen, substituted also by a carbamylalkyl group or alkylcarbamylalkyl group, which aliphatic acid residue has six to thirty carbon atoms inclusive but preferably twelve to eighteen carbon atoms inclusive. It also relates to the methods by which this new class of compounds is formed. The diamidocarboxylic acids and the salts of the present invention have the empirical formula:

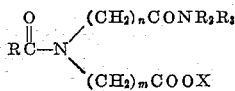

where

represents an aliphatic acid residue of six to thirty carbon atoms inclusive, where $n$ and $m$ represent 1 or 2, and where $R_2$ and $R_3$ respectively represent alkyl or hydrogen; and X represents hydrogen or certain groups capable of forming salts with the carboxylic acid groups, namely, the alkali and alkaline earth metals.

The members of the class of compounds of the present invention are useful as additives in small percentages or mere fractions of one percent to hydrocarbon oils and greases, or other oleaginous vehicles, as effective rust preventive. The U. S. patent application of John D. Spivack and Harry Kroll, Serial No. 370,617, filed July 24, 1953, discloses and claims such rust preventive lubricants. The compounds of the present invention also find utility as detergents and surface active agents, and as intermediates for organic synthesis. Recently the (N-stearoyl) (N-carbamylmethyl) glycine,

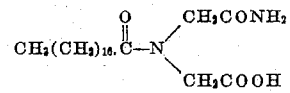

has been tested as the sodium salt and found to be effective as a bactericidal agent in saliva. The test method used was that disclosed in U. S. Patent #2,542,886, issued February 20, 1951. The results were as follows:

| $CH_3(CH_2)_{16}CN \begin{matrix} O \\ \| \end{matrix} \diagdown \begin{matrix} CH_2CONH_2 \\ CH_2COONa \end{matrix}$ wt. percent | Saliva, wt. percent | Glucose, wt. percent | Distilled water, wt. prrcent | Bacterial count,[1] organisms per ml. |
|---|---|---|---|---|
| None | 37.5 | 2.5 | 60 | 34,000,000 |
| 0.25 | 37.5 | 2.5 | 60 | 6,000 |

[1] After 4 hours' incubation.

The diamidocarboxylic acids, their alkali metal and alkaline earth salts of our invention can be prepared in a number of ways, e. g. as indicated in the equations A, B and C hereunder:

(A)
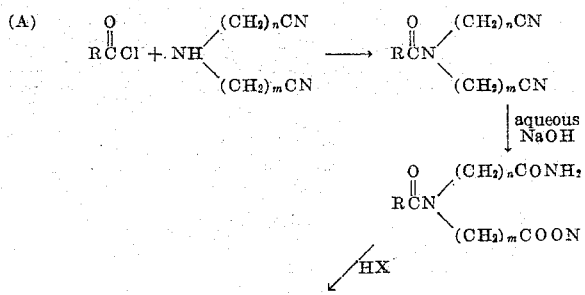

(B)
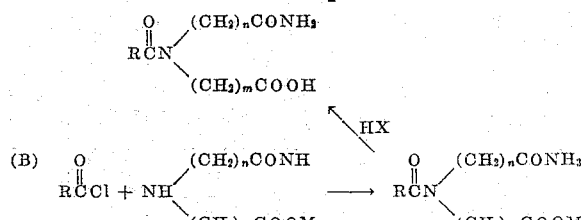

where M is a metal

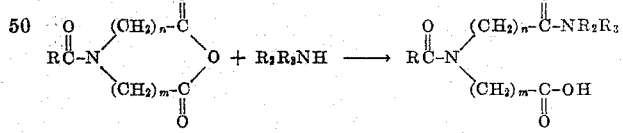

In the empirical structural formulae the letters, R, $R_2$, $R_3$, $n$ and $m$ have the same significance as given in the explanation of the class of compounds of the present invention and presented previously.

Although the compositions which are diamidomonocarboxylic acids can be prepared in several ways, the preferred way is to subject the (N-alkanoyl)iminodiacetonitrile to a controlled hydrolysis in a hot-aqueous solution of an alkali metal hydroxide or an alkaline earth hydroxide, using approximately one equivalent of the inorganic hydroxide in relation to this nitrile, and for a period of time until substantially one equivalent of ammonia has been evolved per mole of (N-alkanoyl) iminodiacetonitrile. This process yields the alkali or alkaline earth metal salts of the (N-alkanoyl) (N-carbamylmethyl) glycine. Another name for this would be the acyl derivative of (N-carbamylmethyl) glycine, substituted on the imino nitrogen atom. If the substituted β alanine derivative of this class is desired, then the nitrile treated would have a greater chain length. In this preferred method of controlled hydrolysis one amine group is formed from a nitrile group but the second nitrile group is further saponified to the salt of a carboxylic acid, yet the acyl amide which is present in the (N-alkanoyl) iminodiacetonitrile is not hydrolyzed.

Some of the compounds included in the general formula supra are: (N-lauroyl) (N-carbamylmethyl) glycine, (N-lauroyl) (N-carbamylmethyl) β alanine, (N-stearoyl)(N-carbamylmethyl) glycine, and (N-stearoyl) (N-carbamylmethyl) β alanine, (N-caproyl or n-hexanoyl) (N-carbamylmethyl) glycine, (N-caproyl or N-hexanoyl) (N-carbamylethyl) β alanine; (N-alkanoyl) (N-carbamylethyl) β alanine, and (N-alkanoyl) (N-carbamylethyl) glycine wherein the "N-alkanoyl" group is any of those listed above. Yet the preferred compounds are those of the substituted amide of the aliphatic acids having $C_{12}$–$C_{18}$ carbon atoms.

The higher molecular weight acid in the amide group can be any of the higher fatty acids, either saturated or olefinic unsaturated, of the chain length $C_6$–$C_{30}$, such as from caproic acid, i. e. n-hexanoic acid through melissic in the saturated series. Many of these higher saturated and unsaturated fatty acids occur as glycerides in fats and oils or as mono-esters in waxes. But higher molecular weight aliphatic acids within this general class which do not occur naturally, such as the mixed carboxylic acids from oxidized liquid or solid hydrocarbons, can be used. It will be understood that mixed acids can be used from any of these sources, i. e., mixed higher fatty acids or the synthetic mixed aliphatic acids from hydrocarbon oxidation, or mixtures of each, etc.

The following examples are presented to illustrate the preparation of the diamido carboxylic acids having the general formula

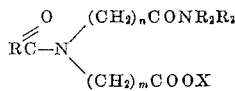

the class of compounds of the present invention.

*Example I*

(N-stearoyl)iminodiacetonitrile (36.1 grams) was dispersed in 170 milliliters of water at 65–70° C. containing 4.4 grams of sodium hydroxide. The temperature of the reaction mixture was gradually raised to 100° C. and maintained at this temperature for 2½ hours until substantially 0.1 mole of ammonia was evolved and swept through the apparatus by a stream of nitrogen. The reaction mixture was then cooled to 20° C. and acidified to pH 2.0 with 6 N hydrochloric acid. A precipitate was formed, filtered, and washed thoroughly with water. After drying 40.0 grams of a light tan powder were obtained. This melted at 134–139° C. with decomposition. It had a neutralization value of 398. The theoretical yield is 39.8 grams and neutralization equivalent weight for (N-stearoyl)(N-carbamylmethyl)glycine is 398. Recrystallization from an isopropylacetate-methanol mixture yielded pure (N-stearoyl)(N-carbamylmethyl)glycine melting at 148–149° C. The found Kjeldahl nitrogen percent was 7.03%. Theory nitrogen percent is 7.03%.

The weight of the (N-stearoyl)iminodiacetonitrile above computes to 0.100 mole, and the weight of the sodium hydroxide computes to 0.11 mole.

*Example II*

31.7 grams of (N-lauroyl)iminodiacetonitrile was dispersed in 250 milliliters of water containing 4.4 grams of sodium hydroxide warmed to 60° C. The reaction mixture was stirred and heated at 95° C. for two hours and twenty-five minutes until substantially 0.1 mole of evolved ammonia had been swept out of the reaction mixture by a stream of nitrogen. After cooling the reaction mixture to 30° C. it was made acid to pH 2.0 with 6 N hydrochloric acid. The precipitate was filtered, washed with water, and dried to a constant weight of 32.5 grams. On recrystallization from ethyl alcohol the purified (N-lauroyl)(N - carbamylmethyl)glycine melted at 148.5–149.5° C. and had a neutralization equivalent weight of 332. The theoretical neutralization equivalent weight of (N-lauroyl)(N-carbamylmethyl)glycine is 314.

The weight of the (N-lauroyl)iminodiacetonitrile above computes to 0.114 mole, and the weight of the sodium hydroxide computes to 0.11 mole.

From the actual yields and neutralization values in these examples, it will be seen that the reaction has gone principally as desired.

Moreover, modifications of the basic concept of our invention here presented will be evident to those skilled in the art. Such modifications are properly to be included within the scope of our disclosed invention, which is in no way to be restricted by the various examples hereinbefore contained, but only by the claims appended hereto.

We claim:

1. The diamidocarboxylic acid and their salts having the generic emperical formula

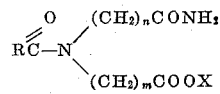

where

represents an aliphatic carboxylic acid residue having six to thirty carbon atoms inclusive, where *n* and *m* each represent the integers 1–2, and X represents hydrogen and metals of the alkali and alkaline earth metal groups.

2. The diamidocarboxylic acid and their salts having the generic emperical formula

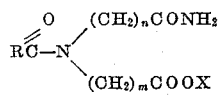

where

represents an aliphatic carboxylic acid residue having twelve to eighteen carbon atoms inclusive, where *n* and *m* each represent the integers 1–2, and X represents hydrogen and metals of the alkali and alkaline earth metal groups.

3. (N-stearoyl)(N-carbamylmethyl)glycine.

4. (N-lauroyl)(N-carbamylmethyl)glycine.

5. The salts of the group consisting of the alkali metals and the alkaline earth metals of (N - stearoyl)(N-carbamylmethyl)glycine.

6. The salts of the group consisting of the alkali metals and the alkaline earth metals of (N-lauroyl)(N-carbamethyl)glycine.

References Cited in the file of this patent

UNITED STATES PATENTS

| | | |
|---|---|---|
| 1,973,860 | Ulrich et al. | Sept. 18, 1934 |
| 2,388,154 | Katzman | Oct. 30, 1945 |

OTHER REFERENCES

"Sur l'acide inimodiacetique et quelques-uns des ses derives," by M. W. J. A. Jongkees. Recueil des Travaux Chemiques des Pays-Bas, vol. 27, 1908, page 287 (attention page 312).